United States Patent [19]

Ohmori

[11] Patent Number: 5,790,193
[45] Date of Patent: Aug. 4, 1998

[54] ACCESSORY MODULE FOR AN ELECTRONIC CAMERA

[75] Inventor: Seishi Ohmori, Setagaya-ku, Japan

[73] Assignee: Eastman Kodak Company, Rochester, N.Y.

[21] Appl. No.: 562,326

[22] Filed: Nov. 22, 1995

[51] Int. Cl.[6] ................................................ H04N 5/225
[52] U.S. Cl. ........................... 348/375; 348/233; 348/333
[58] Field of Search ................................. 348/207, 211, 348/220, 231, 333, 334, 373, 374, 375, 376; 358/906; 396/373, 374, 437, 521, 310, 429

[56] References Cited

U.S. PATENT DOCUMENTS

| 4,853,733 | 8/1989 | Watanabe et al. | |
|---|---|---|---|
| 4,887,161 | 12/1989 | Watanabe et al. | |
| 5,040,068 | 8/1991 | Parulski et al. | |
| 5,130,813 | 7/1992 | Oie et al. | |
| 5,198,851 | 3/1993 | Ogawa | |
| 5,231,501 | 7/1993 | Sakai | |
| 5,289,217 | 2/1994 | Rosenblatt | |
| 5,402,170 | 3/1995 | Parulski et al. | 348/211 |
| 5,438,359 | 8/1995 | Aoki | 348/552 |
| 5,475,441 | 12/1995 | Parulski et al. | 348/552 |
| 5,477,264 | 12/1995 | Sarbadhikari et al. | 348/231 |
| 5,563,655 | 10/1996 | Lathrop | 348/231 |

OTHER PUBLICATIONS

"New Frontiers: Imaging Today & Tomorrow" by Michael J. McNamara. Popular Photography. Nov. 1995.
Ricoh DC-1, "MacPower" Magazine. Oct. 1995.
Toshiba Digital Camera Model 100, "DIME" Magazine. Sep. 21, 1995; p. 131.

Primary Examiner—Andrew I. Faile
Assistant Examiner—Tuan V. Ho
Attorney, Agent, or Firm—David M. Woods

[57] ABSTRACT

An accessory module is used with an electronic camera having an image sensor for generating an image signal, and a card slot for accepting a removable memory card for storing the image signal. The accessory module comprises two parts: an adaptor unit that fits into the card slot of the camera and connects to electronics in the camera and an accessory unit that interfaces with the adaptor unit. The accessory unit includes an image memory for storing the image signal representative of the image captured by the camera, an operational section for operating on the image signal stored in the image memory, and an accessory card slot for receiving the image signal and interfacing with the removable memory card, whereby the memory card can be used with the camera through the accessory card slot despite the card slot in the camera being occupied by the accessory module. According to one embodiment, the operational section in the accessory unit provides for display of the image signal.

2 Claims, 7 Drawing Sheets

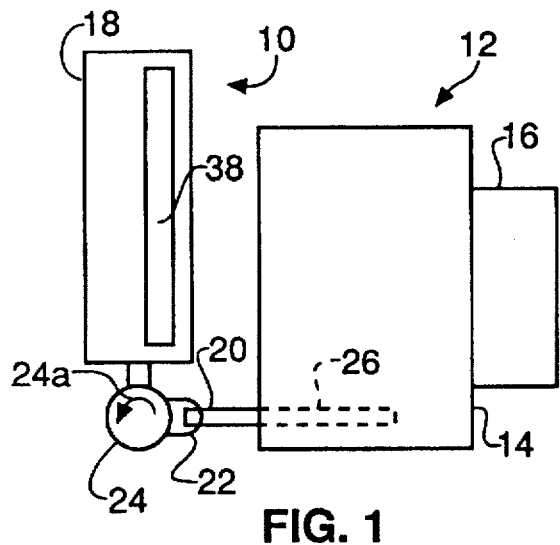
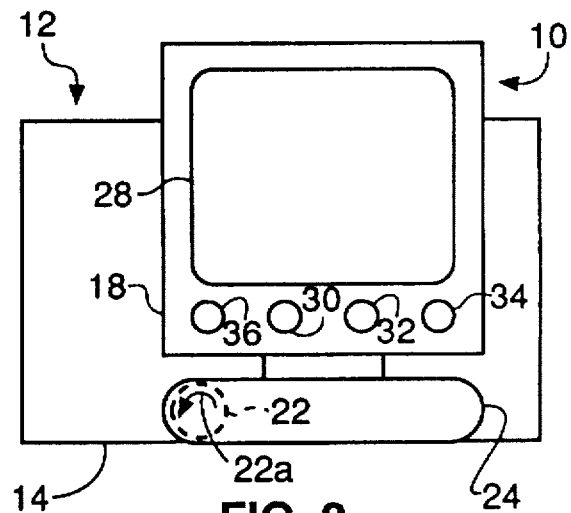
FIG. 1  FIG. 2
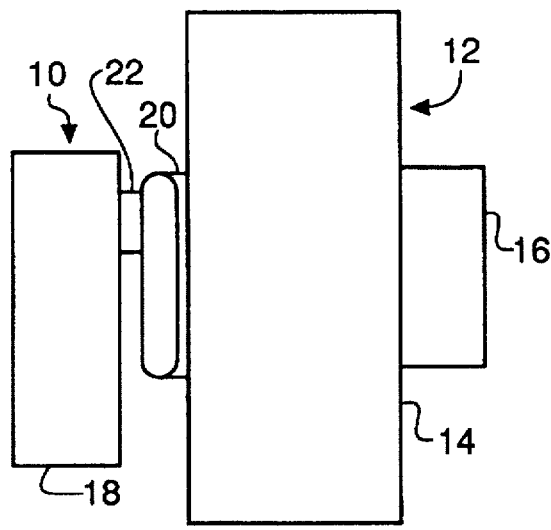
FIG. 3

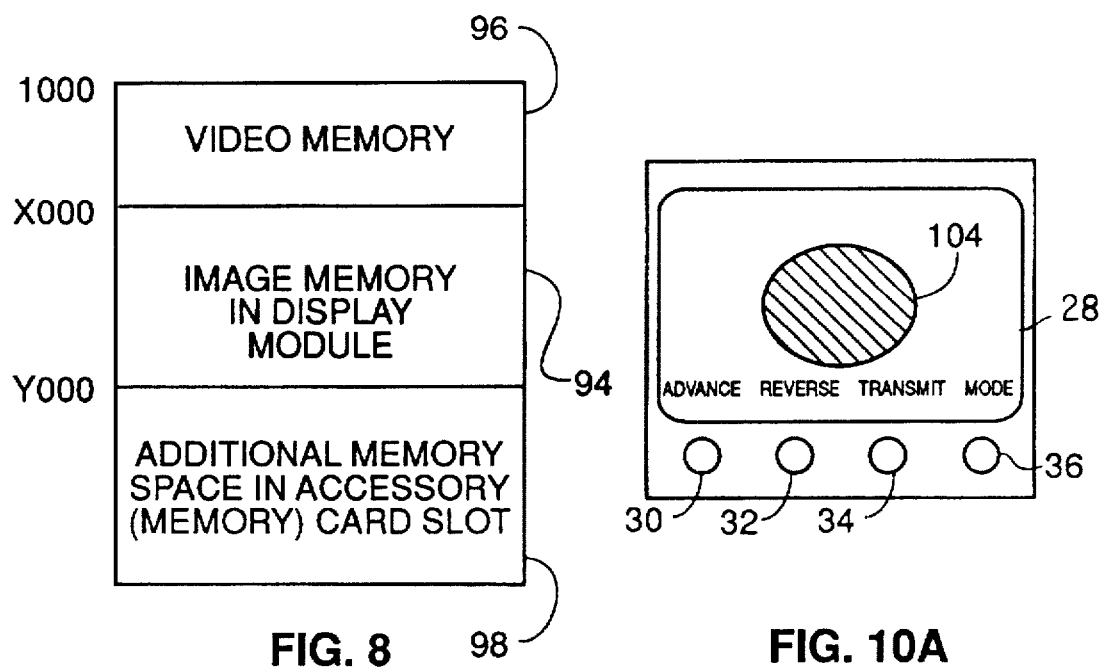
FIG. 8
FIG. 10A
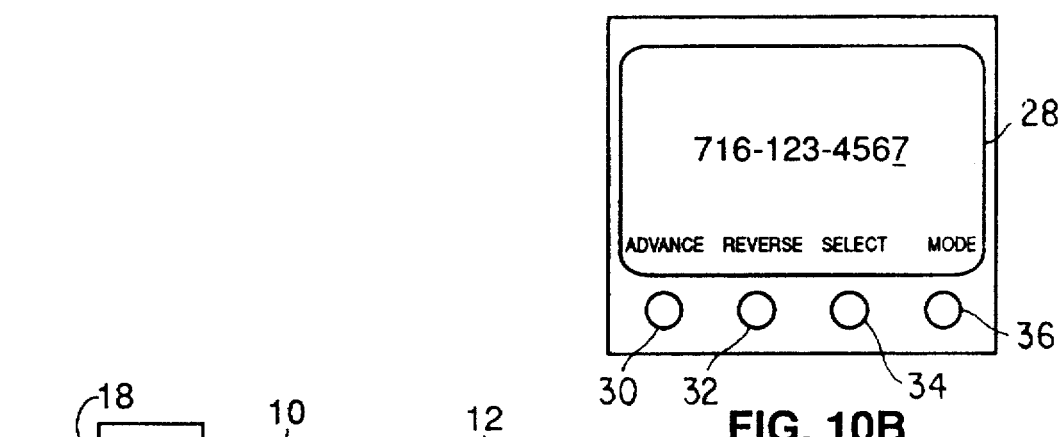
FIG. 10B
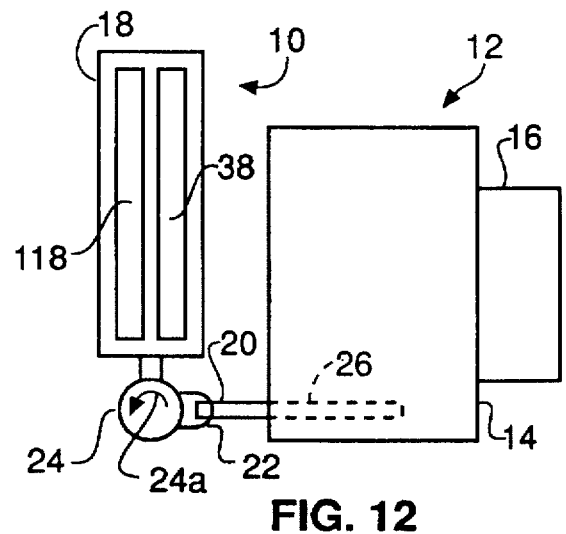
FIG. 12

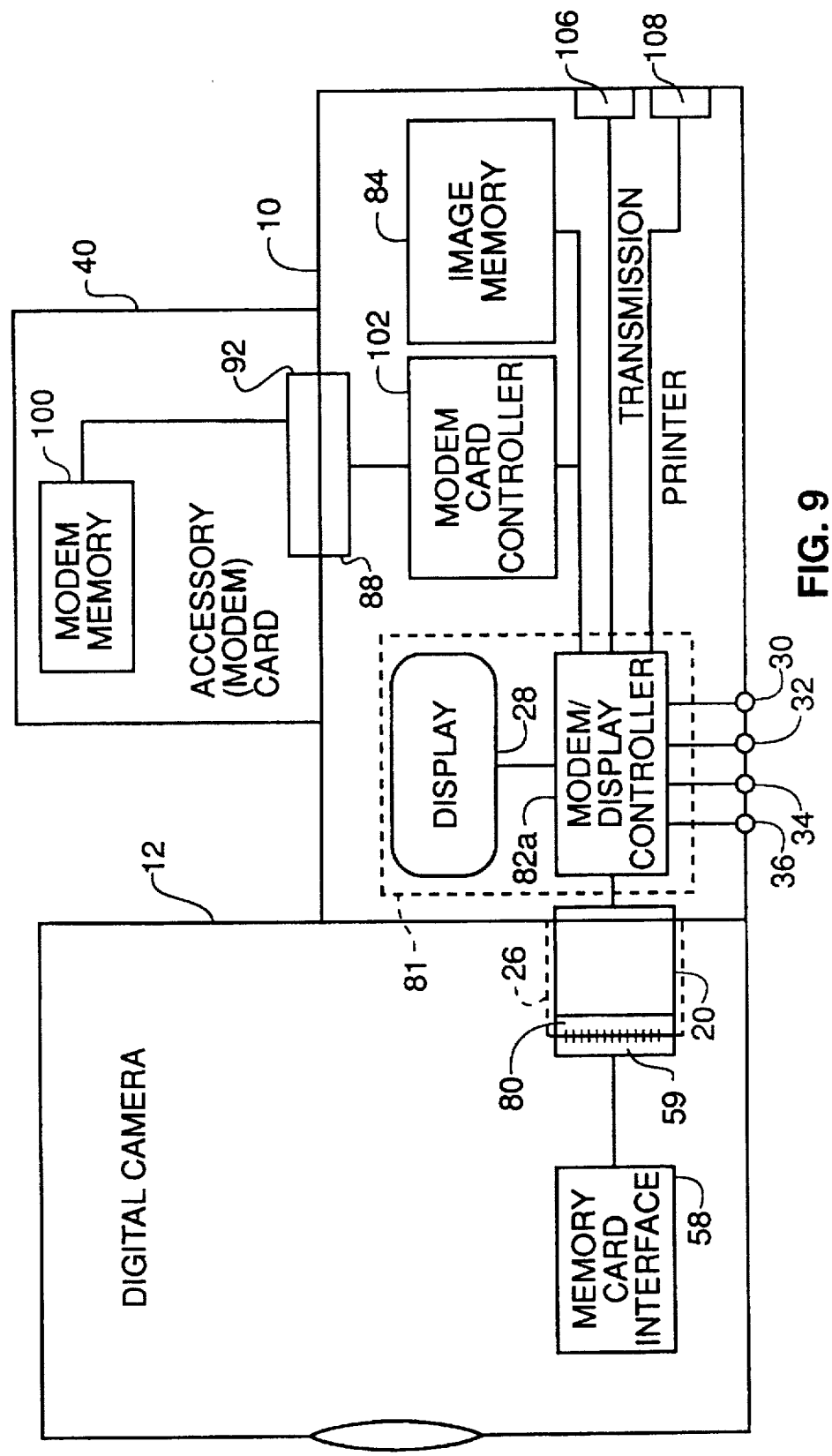

ACCESSORY MODULE FOR AN ELECTRONIC CAMERA

FIELD OF THE INVENTION

The invention relates generally to the field of electronic photography, and in particular to accessory devices for a digital camera that provide, e.g., a display function.

BACKGROUND OF THE INVENTION

Digital electronic cameras often incorporate a display device so that captured images can be easily reviewed by a user of the camera. Such a display device is ordinarily incorporated in one of two ways: either on the camera as an integral part thereof or as an attachment that is connected to the camera when review is desired. Having a display on the camera inevitably increases the size of the camera, particularly given the trend toward larger displays. On the other hand, an attached display device makes the camera even bulkier, adds to power consumption, and is frequently more expensive than an integral display.

Nonetheless, it is desirable to separate the display from the camera in order to keep the camera as small as possible. This type of arrangement is most suitable where the display is used to review already-captured images. It is known to use a small detachable display having a dedicated connector and proprietary interfacing electrical and software protocols. An example is the DC-1 electronic camera offered by Ricoh, which mates with a 2.5 inch snap-on color LCD display monitor. This type of design, however, not only makes the display more expensive but requires that the design be incorporated when the camera is initially designed.

U.S. Pat. No. 4,887,161 shows a memory cartridge having a display device for displaying an image stored in the cartridge. Consequently, the memory cartridge acts as a recording medium for image data captured by a camera as well as a playback device for the captured images. In particular, this arrangement also allows the display device, when attached to the camera, to be utilized as a viewfinder. There are several problems associated with this approach. Since the memory cartridge occupies the memory cartridge connector on the camera, another memory cartridge cannot be used when the display is on the camera. Moreover, the orientation of the display is fixed and viewing the image will become awkward depending on the position and orientation of the memory cartridge connector relative to the orientation of the camera. And to the extent that display is a necessary feature, every memory cartridge used by the camera would need the display feature, which increases the cost and perhaps the size of the memory cartridge.

Consequently, it would be desirable to provide for a convenient accessory display that is useful with a memory card slot on an electronic camera without foregoing a conventional memory card access to the camera.

SUMMARY OF THE INVENTION

Although the present invention is directed to overcoming one or more of the problems set forth above, it became apparent that an auxiliary memory card access could be combined with a number of functions other than display. Briefly summarized, according to one aspect of the present invention, the invention comprises an accessory module for use with an electronic camera having an image sensor for generating an image signal representative of an image captured by the camera, a card slot for accepting a removable memory card, and an interface section for electrically interfacing the camera, including the image signal, with the memory card. The accessory module comprises two parts: an adaptor unit that fits into the card slot of the camera and an accessory unit that interfaces with the adaptor unit. The accessory unit includes an image memory for storing the image signal representative of the image captured by the camera, an operational section for operating on the image signal, and an accessory card slot for interfacing with a removable memory card, whereby the memory card can be used with the camera through the accessory card slot despite the card slot in the camera being occupied by the accessory module.

According to the invention, the operational device in the accessory unit may provide for a number of functions, such as display of the image signal, transmission of the image signal, output of the image signal as a video signal, or processing of the image signal.

ADVANTAGES

The accessory module can be used with many digital cameras because of the flexibility of the interconnection; that is, the interconnection is a conventional memory card interconnection.

Moreover, a user does not loose memory capacity by using this accessory module because the module provides a slot for additional memory capacity, namely, a slot for a memory card. Other functions such as printer interfacing, or video output can be easily added without sacrificing the memory card slot. For instance, a modem card which has the same physical size as the memory card can be inserted into this slot and a user can verify images and send them by the modem.

When configured as a display module, the accessory can be used with many digital cameras because of the flexibility of the display orientation. The example given is the case where the memory card goes horizontally into the camera. However, the display can be oriented in the right direction even if the memory card goes perpendicularly into the camera. This rotating function can be used to view images captured in the portrait direction, as well as the landscape direction.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagram of an accessory module according to the invention, showing a side view of the module attached to a camera;

FIG. 2 is a back view of the module attached to a camera;

FIG. 3 is a top view of the module attached to a camera;

FIG. 8 is a map of memory space used by the first embodiment of the accessory module; and FIG. 9 is a block diagram of a second embodiment of the accessory module;

FIGS. 10A and 10B are illustrations of display screens used in connection with second embodiment.

FIG. 12 is a block diagram of a fourth embodiment of the invention.

DETAILED DESCRIPTION OF THE INVENTION

Figure 4:
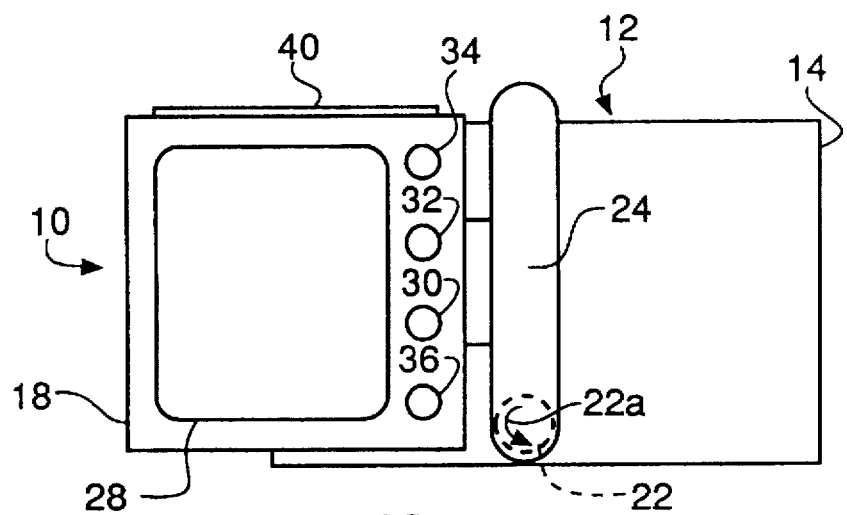
FIG. 4 is a back view of one rotated configuration of the module.

Referring together to FIGS. 1, 2, and 3, an accessory module 10 is shown connected to a camera 12, which includes a camera body 14 and a lens 16. The accessory module 10 comprises two units: an accessory unit 18 and an adaptor unit 20 connected together by a rotatable rod 22 and hinge 24. The accessory unit 18 articulates about the adaptor unit 20 by rotation of the rod 22 and the hinge 24. The direction of rotation of the hinge 24 is specified by an arrow 24a in FIG. 1, and the direction of rotation of the rod 22 is shown by an arrow 22a in FIG. 2 relative to the location (shown in broken lines) of the rod 22. The adaptor unit 20 is an electrical element that goes into a memory card slot 26 in the camera body 14 and connects with electronics (to be described) in the camera 12. The memory card slot normally receives a card adapted to the PCMCIA card interface standard, such as described in the *PC Card Standard, Release* 2.0, published by the Personal Computer Memory Card International Association, Sunnyvale, Calif., September, 1991. The rotatable rod 22 and the hinge 24 also provide an electrical interface between the adaptor unit 20 and the accessory unit 18 so that signals can be transmitted between the camera 12 and the accessory unit 18.

Figure 5:
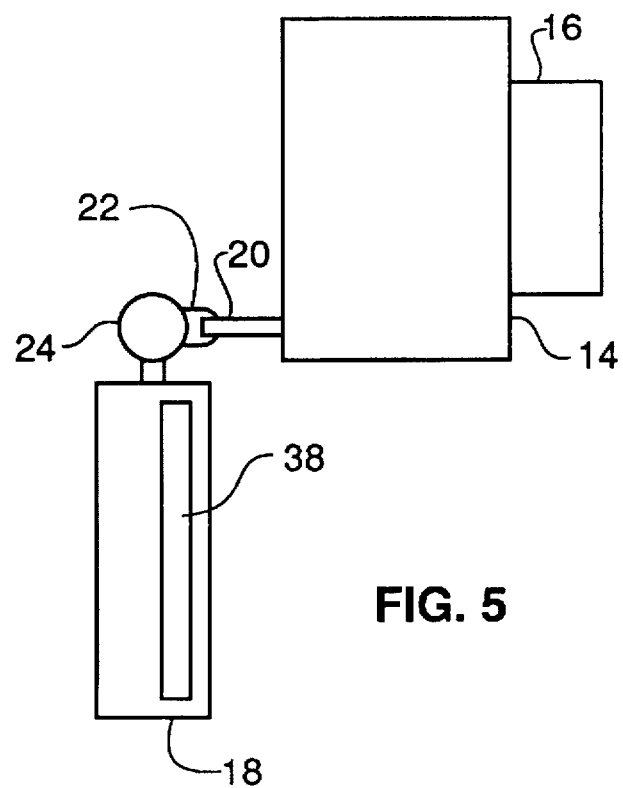
FIG. 5 is a side view of another rotated configuration of the module.

The accessory unit 18 contains a flat panel display 28 for showing images captured by the camera 12, and a group of control buttons, including an advance button 30 for going to the next image, a reverse button 32 for returning to a previous image, and an erase button 34 for erasing the presently displayed image. An additional rotate button 36 causes the image to rotate 90° when the display 28 is rotated, such as shown in FIG. 4 (or 180° as shown in FIG. 5). The control buttons could have different configurations, such as one button being a mode selector (e.g., advance, reverse, or erase) and another button initiating the corresponding action according to the selected mode (incrementing, decrementing, or erasing). The accessory unit 18 also has an accessory card slot 38. The flat panel display 28 would preferably be a liquid crystal display panel.

The accessory unit 18 is connected to the camera body 14 via the hinge 24, the rotatable rod 22, and the adaptor unit 20. The physical size of the adaptor unit 20 is equivalent to that of a conventional memory card, which ordinarily is inserted into the memory card slot 26 on the camera body 14. The accessory unit 18 is capable of swiveling up to 180° around the hinge 24, and rotating up to 180° around the rotatable rod 22. FIGS. 1, 2, and 3 show side, back, and top views, respectively, of the camera 12 with the accessory module 10 in its usual upright position. The rotatable rod 22 is positioned at the end of the hinge 24, as shown best in FIG. 3, and by its end projection (in broken line) in the hinge 24 in FIG. 2. This positioning allows the camera 12 to be stably placed on a flat surface, such as a table. FIG. 4 shows a configuration wherein the accessory unit 18 and the hinge 24 are together rotated by 90° around the rotatable rod 22. FIG. 5 shows another configuration in which the accessory unit 18 is swiveled 180° about the hinge 24 to face the flat panel display 28 forward in order to, e.g., take a self-portrait. FIG. 4 also shows the end of an accessory card 40, after it has been inserted into the auxiliary memory card slot 38.

Figure 6:
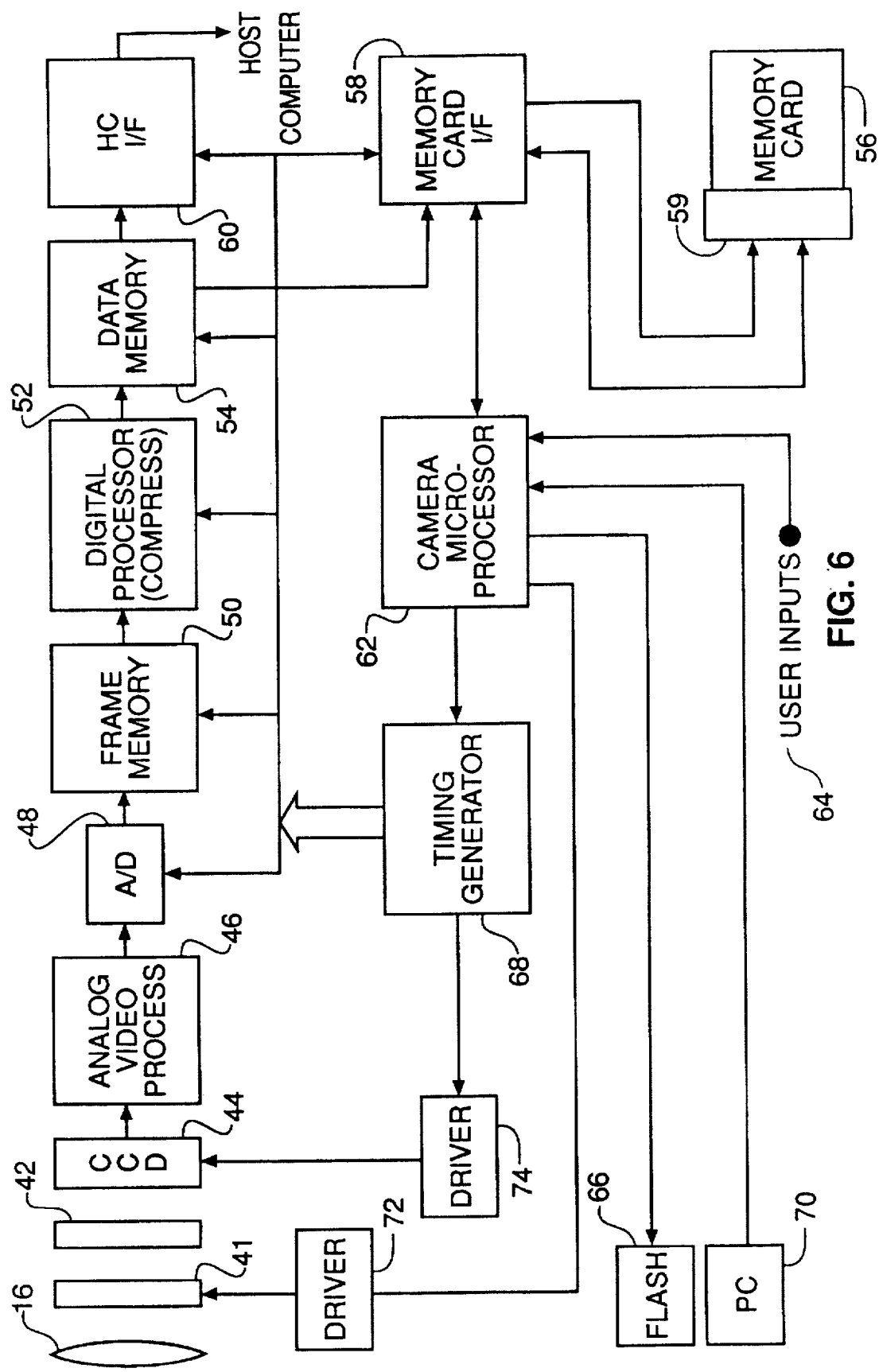
FIG. 6 is a block diagram of the camera shown in FIGS. 1-5.

FIG. 6 is a block diagram of the camera 12 showing the lens 16, which directs image light from a subject (not shown) through an aperture/shutter controller 41 and a blur filter 42 upon an image sensor, which is preferably a charge coupled device (CCD) sensor 44. The sensor 44 generates an image signal that is processed by an analog video processor 46 before being converted into a digital image signal by an analog to digital (A/D) converter 48. The digitized image signal is temporarily stored in a frame memory 50, and then compressed by a digital signal processor 52. The compressed image signal is then stored in a data memory 54 or, if a memory card 56 is present in the memory card slot 26 (see FIG. 1), transferred through a memory card interface 58 to the memory card 56.

Electrical connection between the memory card 56 and the camera 12 is maintained through a card connector 59 positioned in the memory card slot 26 (See FIG. 1). The card interface 58 and the card connector 59 provide, e.g., an interface according to the aforementioned PCMCIA card interface standard. The compressed image signal may also be sent to a host computer connected to the camera 12 through a host computer interface 60. A camera microprocessor 62 receives user inputs 64, such as from a shutter release, and initiates a capture sequence by triggering a flash unit 66 (if needed) and signaling a timing generator 68. The timing generator 68 is connected generally to the elements of the camera 12, as shown in FIG. 6, for controlling the digital conversion, compression, and storage of the image signal. The microprocessor 62 also processes a signal from a photodiode 70 for determining a proper exposure, and accordingly signals an exposure driver 72 for setting the aperture and shutter speed via the aperture/shutter controller 41. The CCD sensor 44 is then driven from the timing generator 68 via a sensor driver 74 to produce the image signal.

Figure 7:
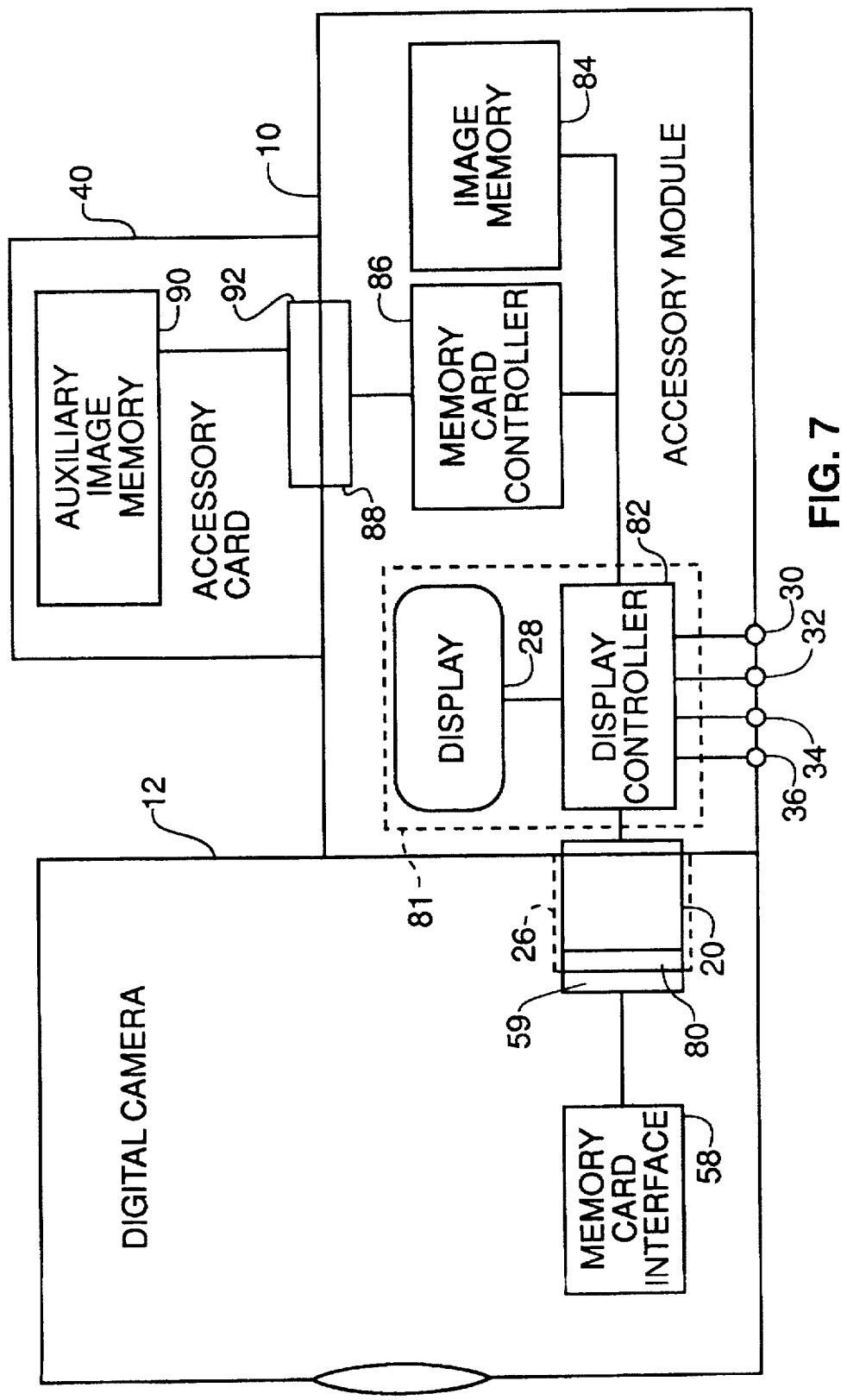
FIG. 7 is a block diagram of a first embodiment of the accessory module.

FIG. 7 depicts in block form a first embodiment of the interconnection of the camera 12, the accessory module 10, and the accessory card 40. The accessory module 10 is electrically connected to the memory card interface 58 in the camera 12 via a card terminal 80 on the adaptor unit 20, which mates with the card connector 59 in the memory card slot 26. The accessory module 10 functions as a display module in FIG. 7, and the accessory card 40 is a memory card, adapted to the PCMCIA card interface standard. The accessory (display) module 10 includes an operational section 81, an image memory 84, the flat panel display 28, a memory card controller 86, and an auxiliary card connector 88 positioned inside the accessory card slot 38 (as shown in FIG. 1).

In this embodiment, the operational section 81 includes a display controller 82 and the flat panel display 28, particularly for the purpose of providing a display module function. The image memory 84 functions as conventional memory in a memory card, and is capable of storing images captured by the camera 12. The accessory (memory) card 40 is also capable of storing captured images in an auxiliary image memory 90 by means of electrical connection between the accessory card connector 88 and an accessory card terminal 92. According to this embodiment, the camera 12 is configured to expect a memory card meeting PCMCIA specifications in its memory card slot 26. The camera 12 thus sees the adaptor 20 as a PCMCIA memory card, and communicates image data through the adaptor 20 to the accessory (display) module 10 just as if the module were a PCMCIA memory card. The accessory (display) module 10 stores the image data in the image memory 84.

The display controller 82 reads image data from the image memory 84 and converts the data into an appropriate format for display on the flat panel display 28. User direction is applied to the display controller 82 through the advance button 30, the reverse button 32, the erase button 34, and the rotate button 36. The user selects a desired image to review by pressing the advance button 30 or the reverse button 32, and erases a selected image after review by pressing the erase button 34. The display controller 82 incorporates a memory management routine that identifies the erased section of the memory 84 and allows it to be reused for newly captured images. The display controller 82, through its memory management routine, also determines when the image memory 84 become full and either signals the condition to the camera 12 or, if an accessory (memory) card 40 is attached to the accessory module 10, redirects newly captured image signals to the accessory (memory) card 40, where they are stored in the auxiliary memory 90.

The display controller 82 decodes addresses sent from the digital camera 12 via the memory card terminal 80 and stores the image data in the image memory 84 or in the accessory (memory) card 40. The memory space in the accessory (display) unit 18 is mapped as depicted in FIG. 8, wherein an image memory address space 94 is allocated for the image memory 84. When the user specifies an image to be displayed, the display controller 82 reads the data from the image memory 84 or from the memory card 40 and reformats the data into a video memory space 94, which starts from the address 1000 in display controller 82. The contents in the video memory space 94 are transferred to the display 28 and the corresponding image is displayed. The user can also transfer images stored in the image memory 84 to the memory card 40 so that, e.g., the user can plug the card into a personal computer (not shown) and the image data can be accessed by the computer. The display controller 82 accomplishes this by transferring the image data from the image memory address space 94 starting X000 to a memory card address space 98 starting at Y000. When memory card controller 86 sees addresses starting at Y000, it converts these addresses to corresponding addresses for the memory card 40. The memory card 40 provides the controller 86 with information regarding the type of the card and how much capacity it has.

Other embodiments of the invention employ other types of cards such as a modem card, a radio transmitter card, a voice recorder-player card, a printer interface card, etc., which can be plugged into the accessory unit 18 instead of the memory card 40. Each card provides the related functionality to the accessory module. For instance, FIG. 9 shows a block diagram of another embodiment of the accessory module, as configured for a modem transmission, with like components having the same reference characters as in FIG. 7. In this case, the operational section 81 include the display 28, and a controller 82a providing display and modem capability. The user can transmit an image to a remote location after verifying the image on the image display 28. In this case, modem/display controller 82a recognizes the type of card and loads necessary user interface commands from a modem memory 100 in the card 40 through a modem card controller 102. New commands are displayed in the display 28 above appropriate buttons, as depicted in FIG. 10A and 10B.

For instance, as shown in FIG. 10A, when a modem card 40 is plugged in, the display 28 shows "Advance", "Reverse", "Transmit" and "Mode" at first. The user pushes "Advance" or "Reverse" button to select a desired image 104 to transmit over modem. After an image to be transmitted is selected by pushing the transmit button 34, this will change the buttons to "Advance", "Reverse", "Select" and "Mode". The user selects a phone number from a list of numbers by pushing the select button 34, or enters a new number using Advance or Reverse buttons, and the modem transmission takes place over a modem cable connection 106. The user can press the Mode button to go to a different mode such a re-selecting an image. When no card is inserted, the display shows "Advance", "Reverse", "Erase" and "Rotate" for the buttons, as described in connection with FIG. 7. FIG. 9 also shows a printer connector 108 for connecting a printer (not shown) in order to print selected images. In this case, the accessory card 40 would also contain printer interface commands for configuring the buttons 30–36. The user interface control commands for various types of cards may instead reside in display module 82 rather than loading from each card. In this case, however, later addition of new types of card which are not planned may prove to be difficult.

Figure 11:
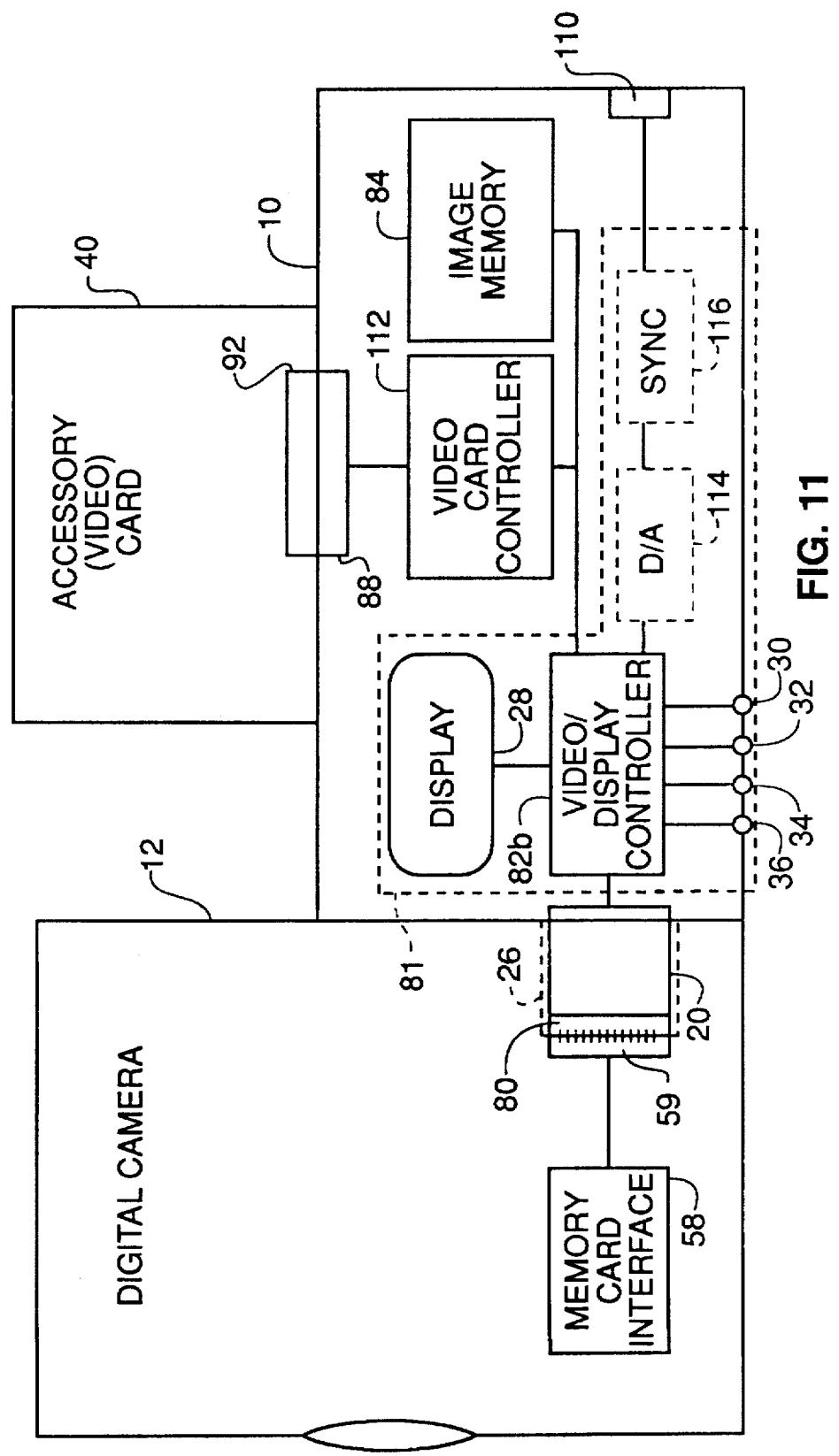
FIG. 11 is a block diagram of a third embodiment of the invention.

FIG. 11 shows a further embodiment of the invention, in which the accessory module 10 provides a video output terminal 110. In this case, the operational section 81 includes the display 28, and a controller 82b providing display and video capability. The video/display controller 82b recognizes the presence of a video card 40 and loads video user interface commands from the card 40 through a video card controller 112. These commands provide a set of button functions, including "advance", "reverse", and "video output". By pushing the "video output" button, the image signal is converted to an analog signal in a digital-to-analog (D/A) converter 114 and combined with video sync signals in a sync generator 116, before being output through the video output terminal 110. The D/A conversion and the sync generation 114 and 116 are shown in broken lines to indicate that this processing could be provided on board the accessory (video) card 40.

In the embodiments shown in FIGS. 9 and 11, the accessory card slot 38 in the accessory unit 18 accepts an accessory card devoted to a specific function; that is, to transmission, printing, or a video output. As shown in FIG. 12, the accessory unit 18 may be provided with a second card slot 118 for an image memory card. Images could then be stored in the memory card through a separate memory card controller, while the aforementioned functions are performed.

The invention has been described with reference to a preferred embodiment. However, it will be appreciated that variations and modifications can be effected by a person of ordinary skill in the art without departing from the scope of the invention. For instance, the functions of the display controller 82, the modem/display controller 82a, and the video/display controller may be provided by a single circuit that is activated differently, depending on the type of card 40 that is used.

| PARTS LIST | |
| --- | --- |
| 10 | accessory module |
| 12 | camera |
| 14 | camera body |
| 16 | lens |
| 18 | accessory unit |
| 20 | adaptor unit |
| 22 | rotatable rod |
| 22a | rotation direction of rod |
| 24 | hinge |
| 24a | rotation direction of hinge |
| 26 | memory card slot |
| 28 | flat panel display |

-continued

PARTS LIST

| | |
|---|---|
| 30 | advance button |
| 32 | reverse button |
| 34 | erase button |
| 36 | video output terminal |
| 38 | accessory card slot |
| 40 | accessory card |
| 41 | aperture/shutter controller |
| 42 | blur filter |
| 44 | CCD sensor |
| 46 | analog video processor |
| 48 | A/D converter |
| 50 | frame memory |
| 52 | digital signal processor |
| 54 | data memory |
| 56 | memory card |
| 58 | memory card interface |
| 60 | host computer interface |
| 62 | camera microprocessor |
| 64 | user inputs |
| 66 | flash unit |
| 68 | timing generator |
| 70 | photodiode |
| 72 | exposure driver |
| 74 | sensor driver |
| 80 | card terminal |
| 81 | operational section |
| 82 | display controller |
| 82a | modem/display controller |
| 82b | video/display controller |
| 84 | image memory |
| 86 | memory card controller |
| 88 | auxiliary card connector |
| 90 | auxiliary image memory |
| 92 | auxiliary card terminal |
| 94 | image memory space |
| 96 | video memory space |
| 98 | memory card space |
| 100 | modem memory |
| 102 | modem card controller |
| 104 | desired image |
| 106 | modem cable connection |
| 108 | printer cable connection |
| 110 | video output terminal |
| 112 | video card controller |
| 114 | D/A converter |
| 116 | sync generator |
| 118 | second card slot |

I claim:

1. An accessory module for use with an electronic camera having an image sensor for generating an image signal representative of an image captured by the camera, a card slot for accepting a removable memory card for storing the image signal, and an interface section for interfacing the image signal with the memory card through a card slot connector in the card slot, said accessory module comprising:

an adaptor unit that fits into the card slot of the camera and connects to the interface section through the card slot connector;

an accessory unit interfacing with the adaptor unit, said accessory unit including an image memory for storing the image signal representative of the image captured by the camera, an image display device for displaying the image signal stored in the image memory, and an accessory card slot for receiving the image signal and interfacing with the removable memory card, whereby the memory card can be used with the camera through the accessory card slot despite the card slot in the camera being occupied by the accessory module; and a movable joint connecting the adaptor unit and accessory unit in order to allow articulation of the accessory unit with respect to the adaptor unit such that the display device is viewable from different viewing directions, said movable joint comprising a hinge connected at one end thereof to a rotatable rod, the adaptor unit being connected to the rod and the accessory unit being connected to the hinge such that two degrees of freedom are permitted between the two units.

2. A display module for use with an electronic camera having an image sensor for generating an image signal representative of an image captured by the camera, a card slot for accepting a removable memory card for storing the image signal, and an interface section for interfacing the image signal with the memory card through a card slot connector in the card slot, said display module comprising:

an adaptor unit that fits into the card slot of the camera and connects to the interface section through the card slot connector;

a display unit connected to the adapter unit, said display unit including an image memory for storing the image signal representative of the image captured by the camera, an image display device for displaying the image signal stored in the image memory, an accessory card slot having an accessory card slot connector for receiving the image signal and interfacing with the removable memory card, an accessory interface section for interfacing the image signal with the memory card through the accessory card slot connector in the accessory card slot, and a controller for controlling the transfer of the image signal between the camera, the image memory, the image display device, and the accessory interface section, whereby the memory card can be used with the camera through the accessory card slot despite the card slot in the camera being occupied by the display module; and a movable joint connecting the adaptor unit and the display unit in order to allow articulation of the display unit with respect to the adaptor unit such that the display device is viewable from different viewing directions, said movable joint comprising a hinge connected at one end thereof to a rotatable rod, the adaptor unit being connected to the rod and the display unit being connected to the hinge such that two degrees of freedom are permitted between the two units.

* * * * *